United States Patent
Zhang

(10) Patent No.: US 9,165,579 B1
(45) Date of Patent: Oct. 20, 2015

(54) AIR BEARING AREA CONFIGURATION FOR REDUCING FLYING HEIGHT HUMP ACROSS A STROKE

(71) Applicant: Western Digital (Fremont), LLC, Fremont, CA (US)

(72) Inventor: Shuyu Zhang, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/499,011

(22) Filed: Sep. 26, 2014

(51) Int. Cl.
*G11B 5/60* (2006.01)
*G11B 5/48* (2006.01)

(52) U.S. Cl.
CPC ............ *G11B 5/4833* (2013.01); *G11B 5/6005* (2013.01); *G11B 5/6064* (2013.01); *G11B 5/6082* (2013.01)

(58) Field of Classification Search
CPC ...... G11B 5/60; G11B 5/6005; G11B 5/6064; G11B 5/6082
USPC ............. 360/235.6, 236.4, 236.2, 235.8, 236, 360/236.1, 236.3, 236.6, 236.8, 236.9, 237
See application file for complete search history.

(56) References Cited

U.S. PATENT DOCUMENTS

| | | | |
|---|---|---|---|
| 5,086,360 A | 2/1992 | Smith et al. | |
| 6,021,020 A | 2/2000 | Itoh et al. | |
| 6,055,127 A | 4/2000 | Boutaghou et al. | |
| 6,075,673 A | 6/2000 | Wilde et al. | |
| 6,097,575 A | 8/2000 | Trang et al. | |
| 6,115,329 A | 9/2000 | Hu | |
| 6,125,014 A | 9/2000 | Riedlin, Jr. | |
| 6,125,015 A | 9/2000 | Carlson et al. | |
| 6,130,863 A | 10/2000 | Wang et al. | |
| 6,137,656 A | 10/2000 | Levi et al. | |
| 6,144,528 A | 11/2000 | Anaya-Dufresne et al. | |
| 6,147,838 A | 11/2000 | Chang et al. | |
| 6,151,196 A | 11/2000 | Carlson et al. | |
| 6,178,064 B1 | 1/2001 | Chang et al. | |
| 6,181,522 B1 | 1/2001 | Carlson | |
| 6,181,673 B1 | 1/2001 | Wilde et al. | |
| 6,212,032 B1 | 4/2001 | Park et al. | |
| 6,229,672 B1 | 5/2001 | Lee et al. | |
| 6,236,543 B1 | 5/2001 | Han et al. | |
| 6,246,547 B1 | 6/2001 | Bozorgi et al. | |
| 6,249,404 B1 | 6/2001 | Doundakov et al. | |
| 6,330,131 B1 | 12/2001 | Nepela et al. | |
| 6,339,518 B1 | 1/2002 | Chang et al. | |
| 6,349,017 B1 | 2/2002 | Schott | |
| 6,373,660 B1 | 4/2002 | Lam et al. | |
| 6,378,195 B1 | 4/2002 | Carlson | |
| 6,445,542 B1 | 9/2002 | Levi et al. | |
| 6,483,667 B1 | 11/2002 | Berg et al. | |
| 6,498,701 B1 | 12/2002 | Berg | |

(Continued)

*Primary Examiner* — Jefferson Evans

(57) ABSTRACT

A disk drive is provided having a dynamic flying height or touch down power profile that is substantially flat across its stroke along the radius of a recording medium. At least two air-channeling elements are provided in a slider of the disk drive, that with the read/write head, flies above a surface of the recording medium. At an inner diameter and an outer diameter of the recording medium, the at least two air-channeling elements direct incoming air flow to an air bearing space defined by a bottom surface of the slider and the surface of the recording medium, increasing the flying height of the slider/read/write head at the inner diameter and outer diameter of the recording medium, thereby negating the effect of a middle diameter flying height hump of the recording medium.

19 Claims, 5 Drawing Sheets

(56) References Cited

U.S. PATENT DOCUMENTS

| | | |
|---|---|---|
| 6,504,682 B1 | 1/2003 | Sannino et al. |
| 6,515,831 B1 | 2/2003 | Sannino et al. |
| 6,522,504 B1 | 2/2003 | Casey |
| 6,538,850 B1 | 3/2003 | Hadian et al. |
| 6,583,953 B1 | 6/2003 | Han et al. |
| 6,594,113 B2 | 7/2003 | Rao et al. |
| 6,646,832 B2 | 11/2003 | Anaya-Dufresne et al. |
| 6,661,612 B1 | 12/2003 | Peng |
| 6,665,146 B2 | 12/2003 | Hawwa et al. |
| 6,680,821 B2 | 1/2004 | Kang |
| 6,690,545 B1 | 2/2004 | Chang et al. |
| 6,704,173 B1 | 3/2004 | Lam et al. |
| 6,708,389 B1 | 3/2004 | Carlson et al. |
| 6,717,773 B2 | 4/2004 | Hawwa et al. |
| 6,721,142 B1 | 4/2004 | Meyer et al. |
| 6,744,599 B1 | 6/2004 | Peng et al. |
| 6,747,847 B2 | 6/2004 | Stoebe et al. |
| 6,771,468 B1 | 8/2004 | Levi et al. |
| 6,785,093 B2 | 8/2004 | Baba et al. |
| 6,796,018 B1 | 9/2004 | Thornton |
| 6,801,402 B1 | 10/2004 | Subrahmanyam et al. |
| 6,856,489 B2 | 2/2005 | Hawwa et al. |
| 6,873,496 B1 | 3/2005 | Sun et al. |
| 6,912,103 B1 | 6/2005 | Peng et al. |
| 6,937,439 B1 | 8/2005 | Chang et al. |
| 6,956,718 B1 | 10/2005 | Kulkarni et al. |
| 6,972,930 B1 | 12/2005 | Tang et al. |
| 7,006,330 B1 | 2/2006 | Subrahmanyam et al. |
| 7,006,331 B1 | 2/2006 | Subrahmanyam et al. |
| 7,010,847 B1 | 3/2006 | Hadian et al. |
| 7,019,845 B1 | 3/2006 | Leary et al. |
| 7,019,945 B1 | 3/2006 | Peng et al. |
| 7,027,264 B1 | 4/2006 | Subrahmanyam et al. |
| 7,027,265 B2 | 4/2006 | Koishi |
| 7,085,104 B1 | 8/2006 | Hadian et al. |
| 7,099,117 B1 | 8/2006 | Subrahmanyam et al. |
| 7,174,622 B2 | 2/2007 | Meyer et al. |
| 7,289,299 B1 | 10/2007 | Sun et al. |
| 7,307,816 B1 | 12/2007 | Thornton et al. |
| 7,315,435 B1 | 1/2008 | Pan |
| 7,315,436 B1 | 1/2008 | Sanchez |
| 7,414,814 B1 | 8/2008 | Pan |
| 7,436,631 B1 | 10/2008 | Fanslau, Jr. et al. |
| 7,474,508 B1 | 1/2009 | Li et al. |
| 7,477,486 B1 | 1/2009 | Sun et al. |
| 7,593,190 B1 | 9/2009 | Thornton et al. |
| 7,595,963 B1 | 9/2009 | Chen et al. |
| 7,599,149 B2 | 10/2009 | Kameyama |
| 7,616,405 B2 | 11/2009 | Hu et al. |
| 7,729,089 B1 | 6/2010 | Hogan |
| 7,995,310 B1 | 8/2011 | Pan |
| 8,081,400 B1 | 12/2011 | Hu |
| 8,087,973 B1 | 1/2012 | Sladek et al. |
| 8,089,730 B1 | 1/2012 | Pan et al. |
| 8,164,858 B1 | 4/2012 | Moravec et al. |
| 8,199,437 B1 * | 6/2012 | Sun et al. ............... 360/236 |
| 8,208,224 B1 | 6/2012 | Teo et al. |
| 8,218,268 B1 | 7/2012 | Pan |
| 8,240,545 B1 | 8/2012 | Wang et al. |
| 8,256,272 B1 | 9/2012 | Roajanasiri et al. |
| 8,270,115 B2 | 9/2012 | Ruiz |
| 8,295,012 B1 | 10/2012 | Tian et al. |
| 8,295,013 B1 | 10/2012 | Pan et al. |
| 8,295,014 B1 | 10/2012 | Teo et al. |
| 8,320,084 B1 | 11/2012 | Shum et al. |
| 8,325,446 B1 | 12/2012 | Liu et al. |
| 8,325,447 B1 | 12/2012 | Pan |
| 8,339,742 B1 | 12/2012 | Sladek et al. |
| 8,339,747 B1 | 12/2012 | Hales et al. |
| 8,339,748 B2 | 12/2012 | Shum et al. |
| 8,343,363 B1 | 1/2013 | Pakpum et al. |
| 8,345,519 B1 | 1/2013 | Pan |
| 8,418,353 B1 | 4/2013 | Moravec et al. |
| 8,441,896 B2 | 5/2013 | Wang et al. |
| 8,446,694 B1 | 5/2013 | Tian et al. |
| 8,456,643 B2 | 6/2013 | Prabhakaran et al. |
| 8,456,776 B1 | 6/2013 | Pan |
| 8,462,462 B1 | 6/2013 | Moravec et al. |
| 8,477,459 B1 | 7/2013 | Pan |
| 8,485,579 B2 | 7/2013 | Roajanasiri et al. |
| 8,488,279 B1 | 7/2013 | Pan et al. |
| 8,488,281 B1 | 7/2013 | Pan |
| 8,490,211 B1 | 7/2013 | Leary |
| 8,493,688 B2 | 7/2013 | Ambekar et al. |
| 8,514,522 B1 | 8/2013 | Pan et al. |
| 8,533,936 B1 | 9/2013 | Puttichaem et al. |
| 8,545,164 B2 | 10/2013 | Choumwong et al. |
| 8,553,365 B1 | 10/2013 | Shapiro et al. |
| 8,587,901 B1 | 11/2013 | Puttichaem et al. |
| 8,593,764 B1 | 11/2013 | Tian et al. |
| 8,599,653 B1 | 12/2013 | Mallary et al. |
| 8,605,389 B1 | 12/2013 | Pan et al. |
| 8,611,050 B1 | 12/2013 | Moravec et al. |
| 8,611,052 B1 | 12/2013 | Pan et al. |
| 8,623,197 B1 | 1/2014 | Kobsiriphat et al. |
| 8,624,184 B1 | 1/2014 | Souza et al. |
| 8,649,126 B2 | 2/2014 | Bolasna et al. |
| 8,665,566 B1 | 3/2014 | Pan et al. |
| 8,665,567 B2 | 3/2014 | Shum et al. |
| 8,665,677 B1 | 3/2014 | Panitchakan et al. |
| 8,665,690 B1 | 3/2014 | Moravec et al. |
| 8,693,144 B1 | 4/2014 | Pan et al. |
| 8,756,795 B1 | 6/2014 | Moravec et al. |
| 8,758,083 B1 | 6/2014 | Rudy et al. |
| 8,760,812 B1 | 6/2014 | Chen et al. |
| 8,770,463 B1 | 7/2014 | Puttichaem et al. |
| 8,773,664 B1 | 7/2014 | Wang et al. |
| 8,792,212 B1 | 7/2014 | Pan et al. |
| 8,792,213 B1 | 7/2014 | Vijay et al. |
| 8,797,691 B1 | 8/2014 | Tian et al. |
| 2002/0008938 A1 | 1/2002 | Nath et al. |
| 2002/0145828 A1 * | 10/2002 | Mundt et al. ............... 360/235.6 |
| 2003/0128471 A1 | 7/2003 | Bolasna et al. |
| 2003/0227717 A1 | 12/2003 | Cha et al. |
| 2004/0027724 A1 * | 2/2004 | Pendray et al. ............ 360/236.3 |
| 2004/0150916 A1 * | 8/2004 | Rao et al. ................. 360/235.8 |
| 2004/0156143 A1 * | 8/2004 | Kang ........................ 360/235.8 |
| 2005/0280943 A1 * | 12/2005 | Inoue et al. ............... 360/236.2 |
| 2007/0146933 A1 | 6/2007 | Matsumoto |
| 2011/0195275 A1 * | 8/2011 | Huha et al. ................ 428/815.1 |
| 2012/0099225 A1 * | 4/2012 | Ambekar et al. ......... 360/236.4 |
| 2012/0281318 A1 * | 11/2012 | Reddy et al. .............. 360/294.6 |
| 2013/0244541 A1 | 9/2013 | Yaemglin et al. |
| 2013/0293982 A1 | 11/2013 | Huber |

\* cited by examiner

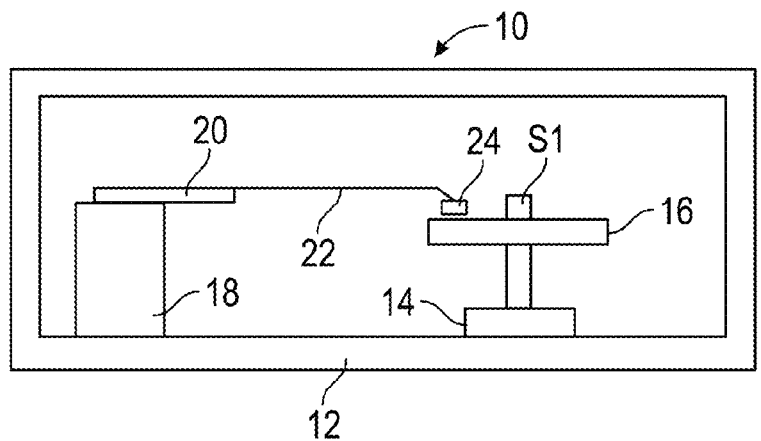
FIG. 1A
(Conventional)
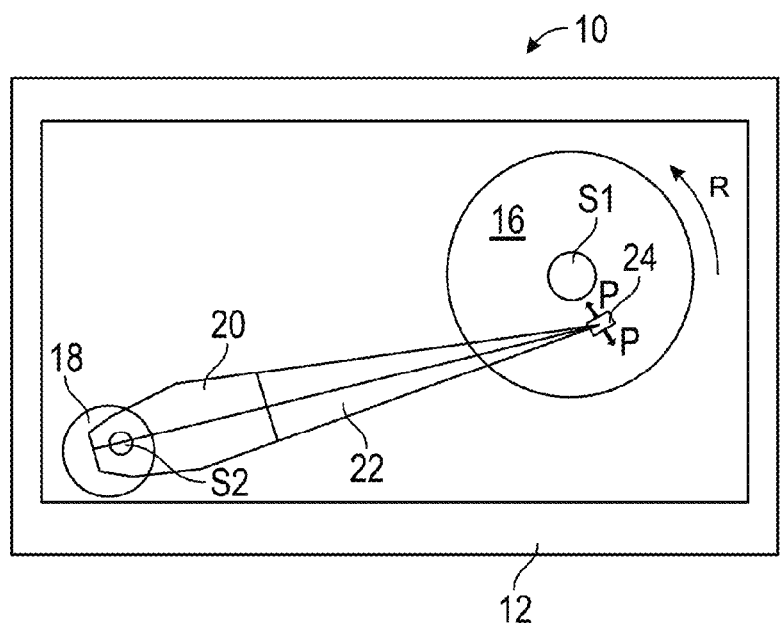
FIG. 1B
(Conventional)

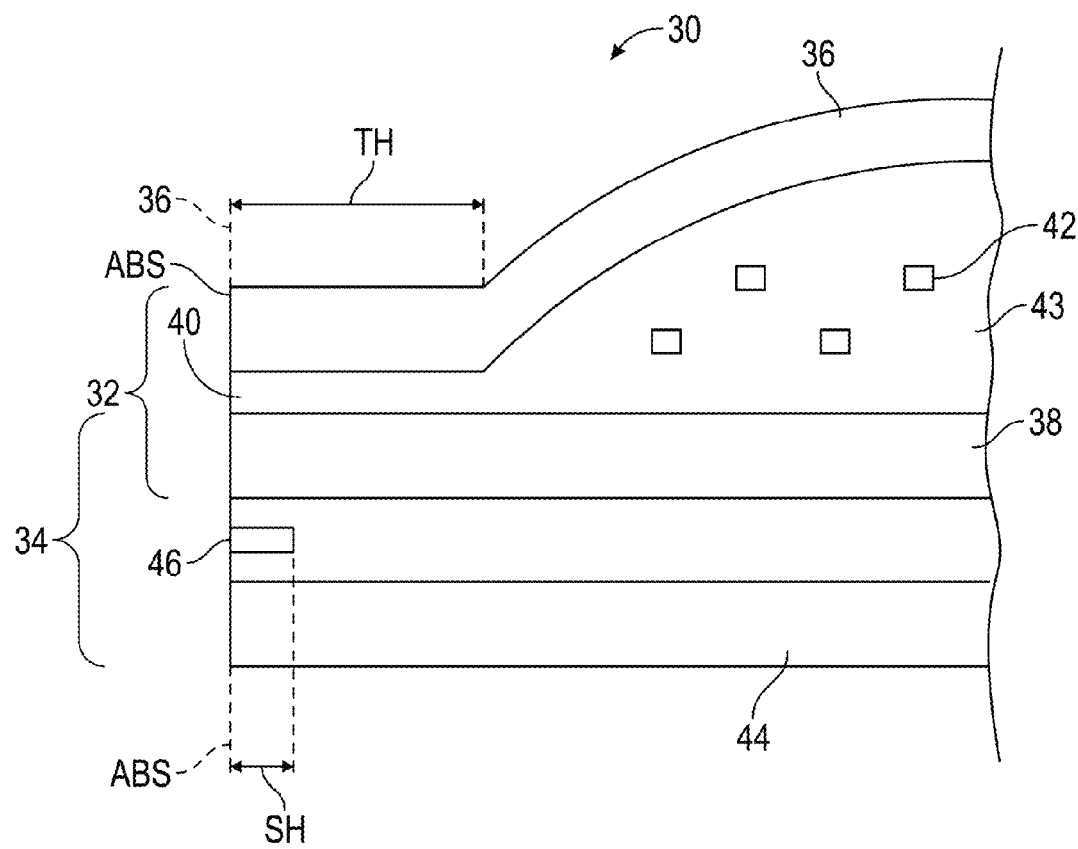
FIG. 1C
(Conventional)

AIR BEARING AREA CONFIGURATION FOR REDUCING FLYING HEIGHT HUMP ACROSS A STROKE

BACKGROUND

In magnetic storage devices such as hard disk drives (HDD), read and write heads are used to magnetically read and write information to and from the storage media. In a HDD, data is stored on one or more disks in a series of adjacent concentric circles. A HDD comprises a rotary actuator, a suspension mounted on an arm of the rotary actuator, and a slider bonded to the suspension to form a head gimbal assembly. In a traditional HDD, the slider carries a read/write head, and radially floats over the recording surface of the disk under the control of a servo control system that selectively position the head over a specific track of the disk.

BRIEF DESCRIPTION OF THE DRAWINGS

Various embodiments are illustrated by way of example, and not limitation, in the figures of the accompanying drawings in which:

FIGS. 1A and 1B illustrate an example of a conventional magnetic disk drive in which a magnetic read element manufactured in accordance with various embodiments may be utilized;

FIG. 1C illustrates an example of a conventional read/write head;

DETAILED DESCRIPTION

Figure 2:
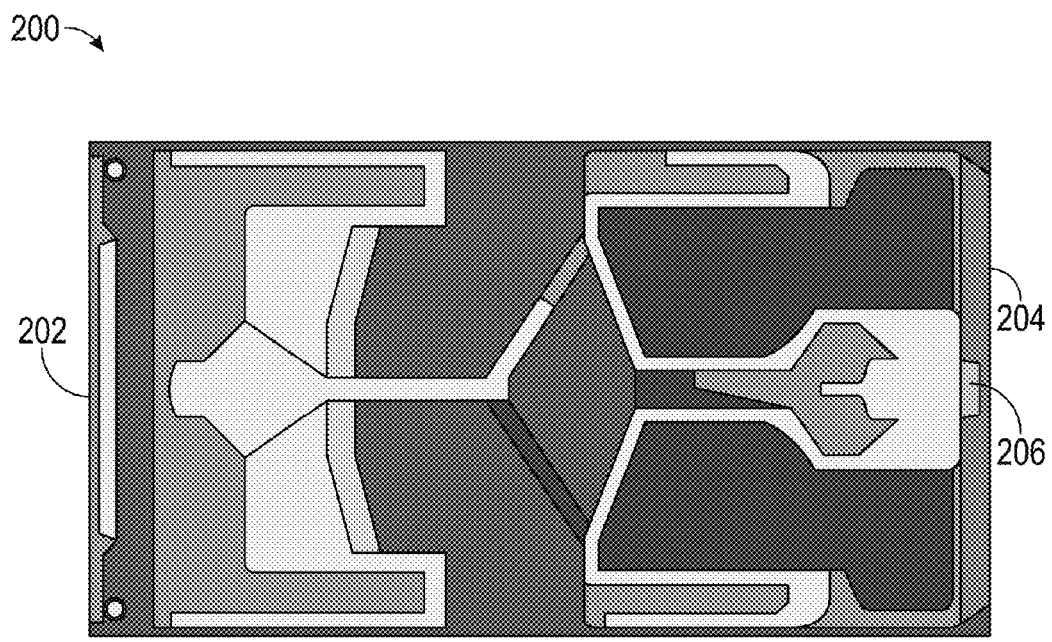
FIG. 2 illustrates a bottom view of an example of a magnetic read/write head configured without air-channeling features.

In the following description, numerous specific details are set forth to provide a thorough understanding of various embodiments of the present disclosure. It will be apparent to one skilled in the art, however, that these specific details need not be employed to practice various embodiments of the present disclosure. In other instances, well known components or methods have not been described in detail to avoid unnecessarily obscuring various embodiments of the present disclosure.

As described above, magnetic storage devices such as HDDs use magnetic media to store data and a movable slider having magnetic transducers positioned over the magnetic media to selectively read data from and write data to the magnetic media. The movable slider and magnetic transducers may be a sub-component of a head gimbal assembly (HGA). A magnetic transducer typically comprises a magneto-resistive read element (e.g., a so-called giant magneto-resistive read element, or a tunneling magneto-resistive read element) and an inductive write structure comprising a flat coil deposited by photolithography and a yoke structure having pole tips that face a disk media.

FIGS. 1A and 1B illustrate an example magnetic disk drive 10 that can include a sealed enclosure 12, a disk drive motor 14, a magnetic disk 16, supported for rotation by a spindle 51 of motor 14, an actuator 18 and an arm 20 attached to a spindle S2 of actuator 18. Suspension 22 is coupled at one end to arm 20, and at its other end to a read/write head or transducer 24. Transducer 24 typically includes an inductive write element with a magneto-resistive read element (shown in FIG. 1C). As motor 14 rotates magnetic disk 16, as indicated by arrow R, an air bearing is formed between an air bearing surface (ABS) of transducer 24 and a surface of magnetic disk 16 causing transducer 24 to lift slightly off of the surface of magnetic disk 16, or, as it is termed in the art, to "fly" above magnetic disk 16. Various magnetic "tracks" of information can be read from magnetic disk 16 as actuator 18 causes transducer 24 to pivot in a short arc as indicated by arrows P.

FIG. 1C illustrates a magnetic read/write head 30 including a write element 32 and read element 34. The edges of write element 32 and read element 34 also define an ABS in a plane which flies above the surface of the magnetic disk 16 during operation.

Read element 34 includes a first shield 44, an intermediate layer 38 which serves as a second shield, and a read sensor 46 located between the first shield 44 and the intermediate layer 38. Read sensor 46 has a particular stripe height and a particular location between the first shield 44 and the second shield 38, both of which are chosen to attain a particular read performance. Control of stripe height is important in controlling device resistance, device output amplitude, device bias point and consequently many related measures of performance. Magneto-resistive sensors can be used with a variety of stripe heights, with a typical stripe height being smaller than about 2 microns, including much less than 1 micron. Further, although read sensor 46 is shown in FIG. 10 as a shielded single-element vertical read sensor, read element 34 can take a variety of forms as is known to those skilled in the art, such as unshielded read sensors.

Write element 32 is typically an inductive write element including the intermediate layer 38 which serves as a first yoke element or pole, and a second yoke element or pole 36, defining a write gap 40 therebetween. First yoke element 38 and second yoke element 36 are configured and arranged relative to each other such that the write gap 40 has a particular nose length, NL. Also included in write element 32, is a conductive coil 42 that is positioned within a dielectric medium 43. As is well known to those skilled in the art, these elements operate to magnetically write data on a magnetic medium such as a magnetic disk 16.

The flying height (FH), which can refer to the aforementioned air bearing space between media (e.g., magnetic disk 16) and the magnetic read/write head 30 (of a transducer) on a slider, is a key parameter that affects the performance of a magnetic storage device. Accordingly, a nominal FH is typically chosen as a careful compromise between each extreme in a classic engineering "trade-off." If the FH is too high, the ability of the transducer to write and/or read information to/from the surface of the media/disk surface is degraded. Therefore, reductions in FH can facilitate desirable increases in the areal density of data stored on a disk surface. However, the air bearing between the slider and the disk surface cannot be eliminated entirely because the air bearing serves to reduce friction and wear (between the slider and the disk surface) to an acceptable level. Excessive reduction in the nominal FH degrades the tribological performance of the disk drive to the point where the disk drive's lifetime and reliability become unacceptable.

One challenge that disk drive engineers face is to maintain the desired nominal FH nearly constant despite changes in radial positioning of the magnetic read/write head. As the radial position of the magnetic read/write head changes, the relative velocity of the disk surface due to disk rotation also changes. Specifically, the relative velocity of the disk surface increases with increasing radius, tending to influence the FH to increase as the slider is radially positioned towards the disk outer diameter (OD), which can be referred to as the "velocity effect" on FH.

Furthermore, as the radial position of the magnetic read/write head changes, the relative direction of incoming air flow changes. Specifically, in magnetic storage drives that utilize a rotary actuator (or a linear actuator having a line of action that does not pass through the disk center) the skew of the slider will change as the actuator changes its radial position relative to the disk surface. As the skew of the slider changes, the direction of incoming air flow relative to the slider changes accordingly, tending to change the FH, which can be referred to as the "skew effect" on FH.

In the past, various methods and/or air bearing features for at least partially cancelling the velocity effect on FH with the skew effect on FH have been developed. For example, certain magnetic storage drives have been designed such that the maximum skew will occur at the disk OD (where the disk surface velocity is highest), thereby partially canceling the two effects. Also for example, so-called Transverse Pressure Contour air bearings have utilized recessed steps along the outer edges of the air bearing side rails to better pressurize the rails when the incoming air flow was significantly skewed.

Attempts have also been made to skew the shape of the trailing pad of certain air bearing designs, and/or one or more pressurizing steps around the trailing pad of certain air bearing designs, to better cancel the skew effect and velocity effect. However the design of the air bearing trailing pad, and/or pressurizing steps adjacent the trailing pad, strongly influences other important FH sensitivities such as sensitivity to changes in ambient pressure (i.e., altitude sensitivity) and sensitivity to the slider or disk crown and camber. These sensitivities strongly depend upon the trailing pad design because the trailing pad typically includes the location where the maximum pressure developed by the air bearing occurs, and the trailing pad is also where the flying height is most important because the trailing pad is typically adjacent the transducer (if any).

Accordingly, many conventional ABS designs result in complex features for achieving that nominal FH. However, it remains that the FH can be higher at the disk middle diameter (MD) than at the disk inner diameter (ID) and OD. This can be referred to as an MD FH hump, and can be attributed to increased air flow, which in turn results in increased pressure/push-back that raises the slider at the disk MD when compared to air flow at the disk ID/OD. The MD FH hump generally prevents the dynamic FH (DFH) and/or touch down (TD) power profile (the DFH power for slider contact with a recording medium due to DFH protrusion) from being flat across the stroke which can have a negative impact on TD and the back off setting. That is, and during read and write operations, the magnetic read/write head moves adjacent to the recording surface of the disk at the Head Disk Interface (HDI) in preparation for performing read and write operations. During this movement, intermittent contact between the magnetic read/write head and disk surface may occur at the HDI, particularly with a low FH between the magnetic read/write head and the surface of the disk. Magnetic read/write heads include a DFH adjustment to control the FH.

In particular, the ABS design with which a magnetic read/write head can be configured attempts to get the magnetic read/write head as close as possible to the surface of the disk. To further reduce that gap/FH, DFH adjustment acts by applying a thermal actuation (via a heater element of the slider) during read and write operations which results in the expansion of the magnetic read/write head. This induces lowering of the magnetic read/write head portion of the slider to the surface of the disk until they touch. Thereafter, the magnetic read/write head is backed/pulled off "slightly," thereby raising the magnetic read/write head off the surface of the disk. The DFH/TD power profile refers to the amount of power needed to apply the requisite thermal actuation/amount of power that needs to be injected into the heater for heating the magnetic read/write head. However, this remains insufficient for flattening the DFH TD power profile across the stroke.

It should further be noted that the heat-driven expansion of the magnetic read/write transducer can produce a protrusion, the protrusion being the area of the magnetic read/write transducer that contacts the surface of the disk. However, the presence of the protrusion can result in a push-back effect, all of which may also affect the FH and ABS design.

Accordingly, various embodiments provide a slider configuration where the magnetic read/write head is raised at both the ID and OD such that the MD FH hump is substantially negated. That is, various embodiments introduce one or more air-directing or air-channeling elements, such as fences, trenches, channels, and/or notches into the slider design that can compensate for the increased air flow at the MD (that leads to the MD FH hump). In particular, such elements can provide increased air flow at the disk ID and OD (where the skew angle(s) are substantially non-zero and where the air flow through the air bearing towards the trailing edge/linear velocity of the disk across the stroke changes). As a result, the slider can be raised relative to the surface of the disk at the ID and OD. Hence, the slider will no longer experience the MD FH hump as the DFH/TD power profile can be flat across the stroke.

FIG. 2 illustrates a bottom view of an example slider 200. Slider 200 can be configured to have a leading edge 202 and a trailing edge 204. Moreover, slider 200 has a transducer 206 proximate to/at the trailing edge 204. The bottom surface of slider 200 makes up an ABS, where the various shaded areas of bottom surface of slider 200 are indicative of areas that have been etched at various depths resulting in different cavities, steps, and/or pads. As alluded to previously, at the disk MD, slider 200/transducer 206 will experience an increased FH due to increased air flow to the ABS of slider 200/transducer 206, which in turn results in the MD FH hump.

Figure 3A:
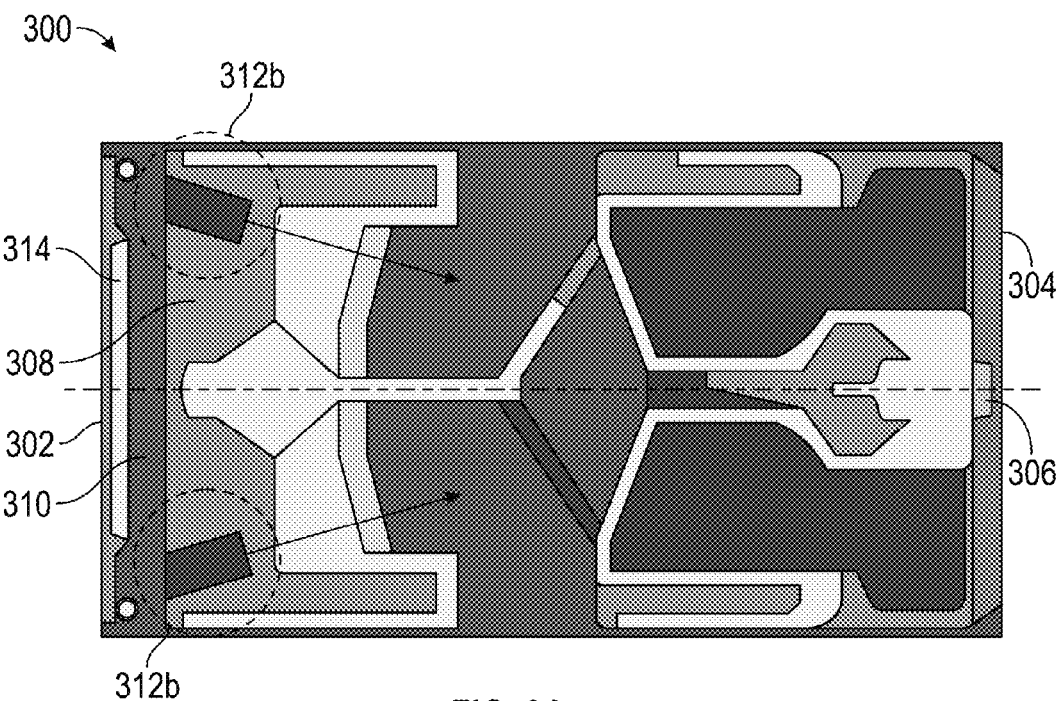
FIG. 3A illustrates a bottom view of the magnetic read/write head of FIG. 2 configured with air-channeling features in accordance with one embodiment.

FIG. 3A illustrates a bottom view of an example slider 300 configured in accordance with one embodiment to have one or more air-channeling elements or features to increase the FH at the disk OD and ID. Similar to slider 200, slider 300 has a leading edge 302, a trailing edge 304, and a transducer 306. In operation, slider 300/transducer 306 flies above the surface of a disk at an angle, where leading edge 302 is raised and trailing edge 304 along with transducer 306 is positioned lower and closer to the surface of the disk.

As described above, and in order to raise the FH of slider 300/transducer 306 at the disk ID and OD, notches 312a and 312b are etched or otherwise implemented into leading step 308. As slider 300/transducer 306 flies above the surface of the disk, the aforementioned incoming flow of air is directed to notches 312a and 312b via a trench 310 etched behind a leading edge fence 314. As can be appreciated, when the flow of air is directed to/through notches 312a and 312b towards the center line of slider 300 (as indicated by the dashed arrows angled towards the dashed center line), slider 300/transducer 306 is lifted. As a result, the MD FH hump of the ABS design of slider 300 is essentially flattened.

It should be noted that due to leading edge fence 314, at a substantially zero skew angle (experienced at the disk MD), air flow can be substantially or at the least, sufficiently blocked from entering trench 310 and/or notches 312a and 312b. In this way, slider 300/transducer 306 is raised only (or substantially only) as slider 300/transducer 306 traverses the disk ID and OD, when the skew angle(s) is substantially non-zero. The effect of this is that the FH of slider 300/transducer 306 may be raised/increased at the disk ID and OD, while the FH of slider 300/transducer 306 at the disk MD remains substantially the same. Even if there is some increased air flow due to notches 312a and 312b at the disk MD, the effect is less than that at the disk ID and OD. Moreover, leading edge fence 314 may also serve to block contamination/particles from entering the air bearing space of slider 300. It should be noted that variations in specific designs/manufacture of a slider and/or its components/elements, there may be some variability in skew angles. Accordingly, various embodiments described herein may be operable within some small range, i.e., at substantially zero/non-zero skew angles.

Figure 3B:
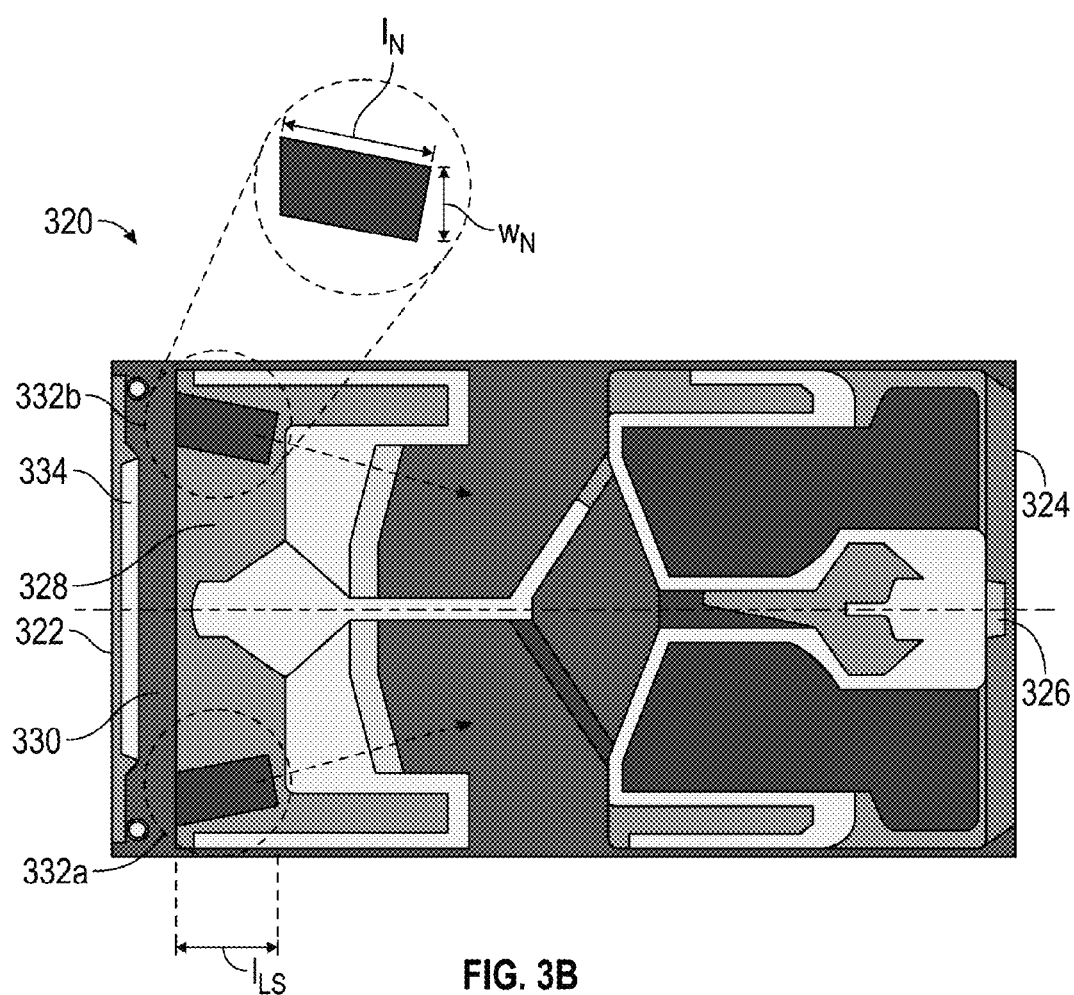
FIG. 3B illustrates a bottom view of illustrate bottom view of the magnetic read/write head of FIG. 2 configured with air-channeling features in accordance with another embodiment.

FIG. 3B illustrates another example slider 320 configured in accordance with another embodiment. Like slider 300, slider 320 may have a leading edge 322, a leading edge fence 334, a trailing edge 324, and a transducer 326. Also similar to slider 300, slider 320 may have notches for enhancing air flow into the air bearing (again, two notches 332a and 332b) in conjunction with trench 330 that can assist in leading more air into the air bearing at the disk ID and OD.

The air-channeling elements or notches may have different sizes, depths, locations/placement as may be desirable depending on the operational/design needs of the slider and ABS to obtain different reduction levels of the MD FH hump relative to the disk ID and OD. For example, and in accordance with one embodiment, such a notch may be configured to have a length $l_N$ that can be anywhere from approximately 10 to 80% of the length of the leading edge/shallow step $l_{LS}$ (328 in FIG. 3B). The notch may further be configured to have a width $w_N$ that can be anywhere from approximately 10 to 50% of the length $l_N$. Moreover, the notches can be angled, e.g., towards the center line of the slider, parallel to the center line/sides of the slider, or angled towards to the sides of the slider. In accordance with one embodiment, each of the notches may be angled anywhere from approximately 0 to 30 degrees towards the center line of the slider (0 degrees being parallel to the center line/sides of the slider).

It should be noted that the number of notches for channeling air to the air bearing of a slider can vary as well. Moreover, the orientation, size, and/or depth of the notches need not necessarily be the same. That is, in a configuration with two notches, one of the notches may be configured for optimal air flow at the disk ID (e.g., taking into account the skew angle(s) at the disk ID), while the other one of the notches may be configured for optimal air flow at the disk OD (e.g., again taking into account the skew angle(s) at the disk OD).

Figure 4A:
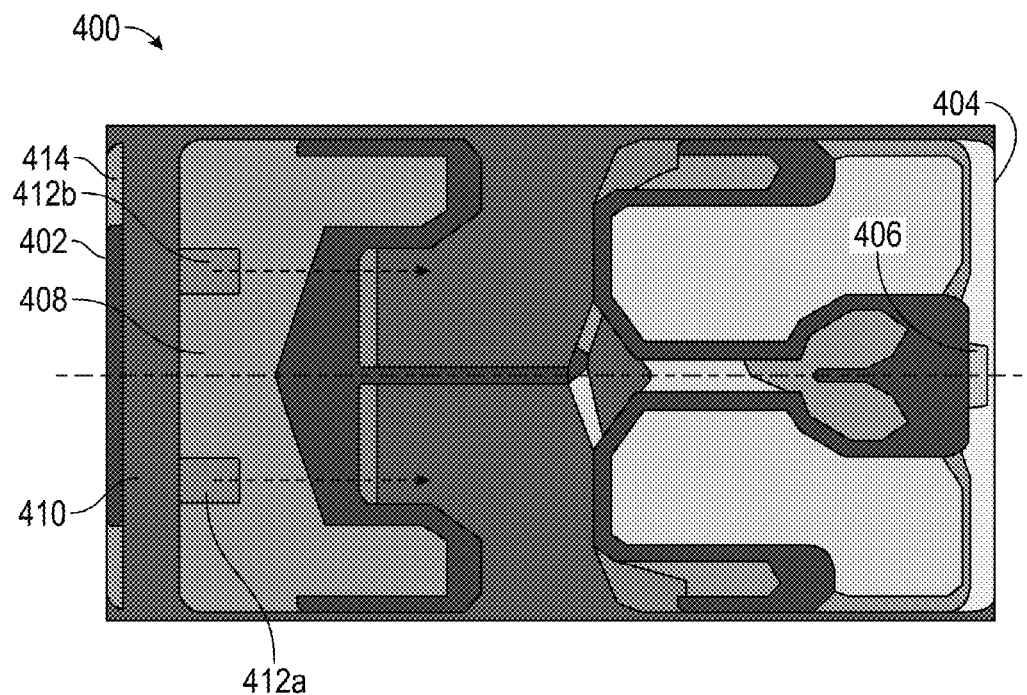
FIG. 4A illustrates a bottom view of another example magnetic read/write head configured with air-channeling features in accordance with various embodiments.

FIG. 4A illustrates a bottom view of still another example slider 400. Slider 400 may have a leading edge 402, a trailing edge 404, and a transducer 406. At or directly behind leading edge 402, is a leading edge fence 414, and behind leading edge fence 414, is a trench 410. Air-channeling notches 412a and 412b may be cut/etched or otherwise implemented at leading edge step 408. In this example, slider 400 incorporates notches 412a and 412b that are parallel to the center line of slider 400. It should be noted that sliders may have varying dimensions. For example, a "Pemto" type slider design may generally refer to a slider having the following dimensions: approximately 1.25 mm long, approximately 0.7 mm wide, and approximately 0.23 mm thick, although some manufacturers due to particular manufacturing requirements may configure a Pemto type slider to be, e.g., approximately 1.35 mm long. A "Femto" type slider may generally refer to a slider having the following dimensions: approximately 0.85 mm long, approximately 0.7 mm wide, and approximately 0.23 mm thick. In accordance with one example, slider 400 may be a Pemto type ABS slider design, where the length of slider 400 is approximately 1.253 mm, the width is approximately 0.7 mm, and the thickness at its largest (shallowest etched area(s)) is approximately 0.23 mm. In accordance with another example, slider 400 may be a Femto type ABS slider design, where one or more dimensions of slider 400 and/or one or more elements of slider 400 may be decreased. For example, and as discussed above, the length of a Femto type ABS slider configured in accordance with another example may be about 0.85 mm, the width may be about 0.7 mm, and the thickness at its largest (shallowest etched area(s)) may be about 0.23 mm.

Figure 4B:
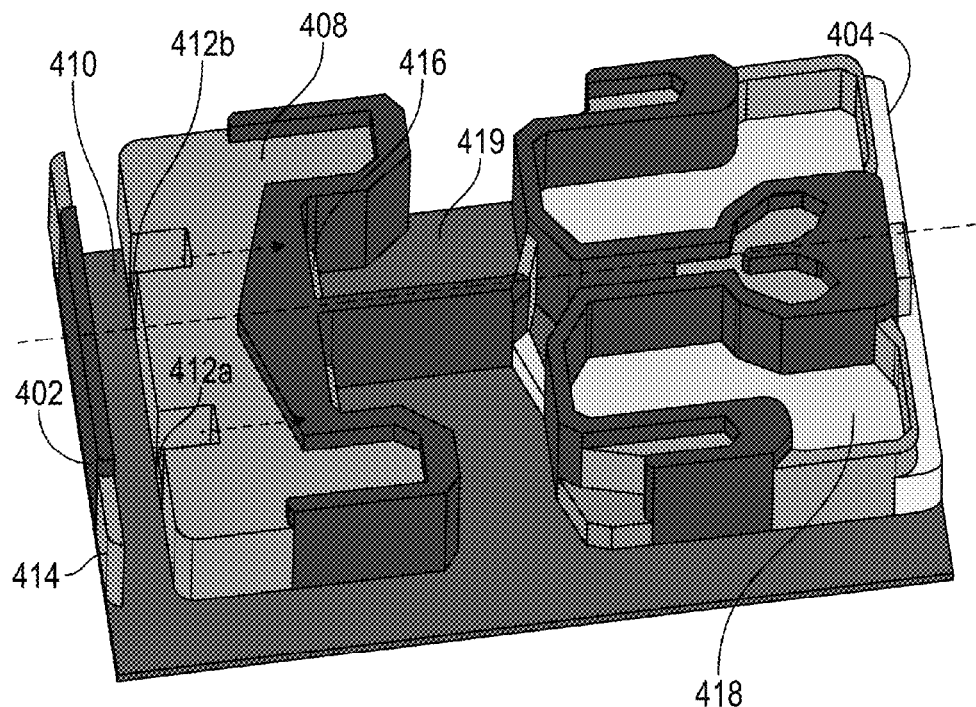
FIG. 4B illustrates a perspective bottom view of the example magnetic read/write head of FIG. 4A.

FIG. 4B illustrates a perspective bottom view of slider 400 and the respective depths of certain areas therein. Leading edge step 408 may be a relatively shallow step being etched to a depth of approximately 0.1 to approximately 0.2 microns. A secondary shallow cavity 416 may be etched to a depth of approximately 0.4 to 0.8 microns. A deeper (side) cavity 418 may be etched to a depth of approximately 0.8 to approximately 1.5 microns. The deepest (forward) cavity (in this embodiment) 419 may be etched to a depth of approximately 1.5 to approximately 3.0 microns.

A flat FH profile across the stroke has been a long time goal for ABS designs because a flat FH profile is beneficial to obtaining a tightened head media spacing budget across a stroke with or without DFH. Various embodiments provide an easy and convenient mechanism that allows ABS designers to flatten an ABS FH profile to reach design requirements during an ABS optimization. It should be noted that although various embodiments disclosed herein have been described in the context of magnetic recording media, various embodiments can be adapted for use with other forms of media, e.g., magneto-optical disks, optical disks, etc. As an added advantage, the flattened ABS FH profile (resulting from the trench and/or air-channeling elements/features incorporated into the slider) translates into more actuation efficient (of the actuator over the ID, OD, and MD) during operation of the HDD.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

The terms "over," "under," "between," and "on" as used herein refer to a relative position of one media layer with respect to other layers. As such, for example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in contact with that second layer. Additionally, the relative position of one layer with respect to other layers is provided assuming operations are performed relative to a substrate without consideration of the absolute orientation of the substrate.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration. Moreover, the dimensions in these diagrams and illustrations are not necessarily drawn to scale.

What is claimed is:

1. A slider, comprising:
   a leading edge and a trailing edge;
   a transducer proximate to the trailing edge for performing read and write operations on a recording medium;
   a fence proximate to and parallel to the leading edge;
   a trench positioned behind the fence; and
   at least two air-channeling elements configured to direct air flow received by the trench substantially towards an air bearing space between the slider and the recording medium, wherein each of the at least two air-channeling elements is etched into a leading step of the slider, and wherein the leading step is etched to a depth of approximately 0.1 to 0.2 microns below the highest point of an air bearing surface of the slider.

2. The slider of claim 1, wherein the slider is one of a pemto type slider or a femto type slider.

3. The slider of claim 1, wherein each of the at least two air-channeling elements comprise a substantially elongated notch etched into the leading step.

4. The slider of claim 3, wherein each of the at least two air-channeling elements are angled such that the air flow is directed substantially towards a longitudinal center of the slider.

5. The slider of claim 3, wherein each of the at least two air-channeling elements are substantially parallel to the longitudinal center of the slider.

6. The slider of claim 1, wherein the at least two air-channeling elements are configured to direct air flow towards the air bearing space while the slider is operative at an inner diameter portion of the recording medium and at an outer diameter portion of the recording medium.

7. The slider of claim 1, wherein the at least two air-channeling elements are configured to direct air flow towards the air bearing space substantially only while a skew angle of the slider relative to the recording medium is substantially non-zero.

8. The slider of claim 1, wherein the fence substantially prevents air flow from reaching the at least two air-channeling elements while a skew angle of the slider relative to the recording medium is substantially zero.

9. The slider of claim 1, wherein the fence protects against entry of contaminating particles into the air bearing space.

10. A disk drive, comprising:
    a rotatable recording medium;
    a longitudinal slider having a leading edge and a trailing edge, a bottom surface of the longitudinal slider proximate to the rotatable recording medium defining an air bearing surface;
    a transducer proximate to the trailing edge for performing read and write operations on the rotatable recording medium;
    a fence proximate to and parallel to the leading edge;
    a trench positioned behind the fence; and
    at least two air-channeling elements configured to substantially lift the longitudinal slider with air flow received by the trench and directed to the air bearing surface, wherein each of the at least two air-channeling elements is etched into a leading step of the longitudinal slider, the leading step being etched to a depth of approximately 0.1 to 0.2 microns below the highest point of the air bearing surface of the longitudinal slider.

11. The disk drive of claim 10, wherein the at least two air-channeling elements are configured to substantially lift the longitudinal slider when the longitudinal slider is positioned over a portion of the rotatable recording medium such that a skew angle of the longitudinal slider is substantially non-zero.

12. The disk drive of claim 10, wherein the length of at least one of the at least two air-channeling elements is configured to be approximately 10 to 80% of the length of a leading edge of the longitudinal slider.

13. The disk drive of claim 12, wherein the width of at least one of the at least two air-channeling elements is configured to be approximately 5 to 25% of the length of the leading edge of the longitudinal slider.

14. The disk drive of claim 10, wherein the at least two air-channeling elements are asymmetrically configured.

15. The disk drive of claim 10, where at least one of the at least two air-channeling elements is positioned such that a first end of the at least one of the at least two air-channeling elements proximate to the leading edge is substantially orthogonal to the leading edge and a second end of the at least one of the at least two air-channeling elements distal from the leading edge is angled approximately 0 to 30 degrees towards a centerline bisecting the longitudinal slider.

16. The disk drive of claim 10, wherein a depth of each of the at least two air-channeling elements is less than a depth of the trench.

17. The disk drive of claim 10, wherein a first air-channeling element of the at least two air-channeling elements is configured for optimal channeling of air flow at an inner diameter portion of the rotatable recording medium, and wherein a second air-channeling element of the at least two air-channeling elements is configured for optimal channeling of air flow at an outer diameter portion of the rotatable recording medium.

18. A disk drive, comprising:
a recording medium;
an actuator;
a suspension mounted to an arm of the actuator; and
a slider bonded to the suspension, wherein the slider carries a read/write head configured to radially fly over a surface of the recording medium and is configured with at least two air-channeling elements for directing air flow to achieve a dynamic flying height or touch down power profile that is substantially flat across the stroke the arm of the actuator substantially through the entire radius of the recording medium, wherein each of the at least two air-channeling elements is etched into a leading step of the slider, and wherein the leading step is etched to a depth of approximately 0.1 to 0.2 microns below the highest point of an air bearing surface of the slider.

19. The disk drive of claim 18, wherein the slider further comprises a trench etched between a fence adjacent the leading edge of the slide and the leading step for directing air flow into the two air-channeling elements.

* * * * *